UNITED STATES PATENT OFFICE.

DANIEL J. REILY AND ALFRED DE MATTEI, OF SAN FRANCISCO, CALIFORNIA.

CORE.

1,286,106. Specification of Letters Patent. Patented Nov. 26, 1918.

No Drawing. Application filed August 27, 1918. Serial No. 251,696.

*To all whom it may concern:*

Be it known that we, DANIEL J. REILY and ALFRED DE MATTEI, citizens of the United States, residing at the city and county of San Francisco and State of California, have invented new and useful Improvements in Cores, of which the following is a specification.

This invention relates to a composition of matter, and particularly pertains to a material for making casting cores.

At the present time it is universal practice to form casting cores from a composition of sand and other material, preferably using a binder of flour. Due to the great demand for flour it is highly desirable to eliminate its use from the core composition, and to provide a composition of matter adapted for use in making cores which will be inexpensive, and will lend itself to all of the requirements of a foundry.

It is the principal object of this invention, therefore, to provide such a composition which is composed of ingredients easily obtained, and, which ingredients do not require the addition of any binding material whatsoever.

The present invention contemplates the use of a sand and clay mixture, which naturally adhere, and which may be directly mixed and readily formed into the design desired, said core thereafter being easily dried and when used in a casting eliminates the necessity of providing vent openings throughout the core.

The composition preferably consists of one part yellow clay with three parts of sand, the clay and sand may be mixed with any proportion of water desired to form a proper plastic material. In some cases the proportion of clay and sand must be varied. In each instance, however, it is not necessary to use any additional ingredient as a binder. When the composition has been formed it may be used in making the desired core, and due to its inert nature permits the core to be made solid without any vent holes in any of its parts. After having been made it may be placed in an oven and the moisture expelled therefrom. This drying operation takes place in a very short time as compared with the many hours required to dry cores using special binding materials, such as flour, oils, resin and pitch. When the core is thus dried it may be used in a mold, and in practice has proven that it will not cause blow holes in the casting. This is undoubtedly due to the fact that the binders commonly used produce a gas when heated, and thus as this gas escapes holes will be formed in the casting. As the present composition possesses no gas forming substance it will remain inert when heated, thus insuring a sound casting from which the composition may be satisfactorily cleaned. It will thus be seen that the composition here provided for the manufacture of cores, while formed of simple ingredients readily obtainable, at the same time insures that inexpensive cores may be made in a minimum amount of time, and that when used will produce results superior to the ordinary cores, both as to the saving of labor and the production of perfect castings.

Having thus described our invention, what we claim and desire to secure by Letters Patent is:

1. A composition of matter for the manufacture of cores, consisting of yellow clay and sand.

2. A compound consisting of one part yellow clay and three parts of sand mixed to form a plastic mass.

3. A core composition comprising one part of yellow clay, three parts of sand, and sufficient water to mix the ingredients.

In testimony whereof we have hereunto set our hands in the presence of two subscribing witnesses.

DANIEL J. REILY.
ALFRED DE MATTEI.

Witnesses:
JOHN H. HERRING,
JAMES M. ABBETT.